US009833944B1

(12) United States Patent
Huthmaker

(10) Patent No.: US 9,833,944 B1
(45) Date of Patent: Dec. 5, 2017

(54) PRINTER PLATES FOR THREE DIMENSIONAL PRINTING

(71) Applicant: Robert Wayne Huthmaker, West Palm Beach, FL (US)

(72) Inventor: Robert Wayne Huthmaker, West Palm Beach, FL (US)

( * ) Notice: Subject to any disclaimer, the term of this patent is extended or adjusted under 35 U.S.C. 154(b) by 184 days.

(21) Appl. No.: 14/717,351

(22) Filed: May 20, 2015

Related U.S. Application Data

(60) Provisional application No. 62/002,605, filed on May 23, 2014, provisional application No. 62/041,243, filed on Aug. 25, 2014.

(51) Int. Cl.
*B29C 59/02* (2006.01)
*B29K 263/00* (2006.01)
*B33Y 30/00* (2015.01)
*B33Y 10/00* (2015.01)

(52) U.S. Cl.
CPC .......... *B29C 59/02* (2013.01); *B29K 2263/00* (2013.01); *B33Y 10/00* (2014.12); *B33Y 30/00* (2014.12)

(58) Field of Classification Search
CPC ............ B29C 67/0051; B29C 67/0085; B29C 67/0092; B33Y 10/00; B33Y 30/00
USPC ............................................. 425/375, 174.4
See application file for complete search history.

(56) References Cited

U.S. PATENT DOCUMENTS

| 5,939,008 A * | 8/1999 | Comb ................. B29C 67/0062 264/308 |
| 6,986,654 B2 | 1/2006 | Imiolek et al. |
| 8,185,229 B2 | 5/2012 | Davidson |
| 8,188,373 B2 * | 5/2012 | Hunrath ................ H05K 1/0271 174/257 |
| 2010/0100222 A1 * | 4/2010 | Skubic ................ B29C 67/0085 700/110 |

(Continued)

FOREIGN PATENT DOCUMENTS

| CN | 1978189 A | 6/2007 |
| WO | 2013173742 A1 | 11/2013 |

OTHER PUBLICATIONS

Autum FR-4 Tg170 (AT-6167) Datasheet, accessed Nov. 28, 2016.*

(Continued)

*Primary Examiner* — Matthew Daniels
*Assistant Examiner* — Lawrence D Hohenbrink, Jr.
(74) *Attorney, Agent, or Firm* — Darrow Mustafa PC

(57) ABSTRACT

Printer plates for used in connection with three dimensional printing are described. The printer plate can include a plurality of layers. The printer plate can include a base layer that has a first face and an opposite second face. The printer plate can include a first outer layer. The first outer layer can be operatively connected to the first face of the base layer. The first outer layer can have an outer surface that defines a first build surface of the printer plate. The first outer layer can be made of a different material than the base layer. The first outer layer being at least partially made of an uncross-linked methyl methacrylate-based acrylic resin, a reinforced acrylic resin, an acrylic resin impregnated laminate, or polyetherimide. In one or more arrangements, the printer plate can also include a second outer layer operatively connected to a second face of the base layer.

24 Claims, 6 Drawing Sheets

(56) References Cited

U.S. PATENT DOCUMENTS

2013/0186558 A1* 7/2013 Comb ................ B29C 67/0051
                                                156/277
2013/0292862 A1   11/2013 Joyce
2013/0307193 A1   11/2013 Johnson et al.
2014/0048969 A1    2/2014 Swanson et al.
2014/0048970 A1    2/2014 Batchelder et al.
2014/0065194 A1    3/2014 Yoo et al.
2017/0036403 A1*   2/2017 Ruff .................... B29C 67/0055

OTHER PUBLICATIONS

Helios PCB Heatbed, http://reprap.org/wiki/Helios_PCB_Heatbed, published Nov. 9, 2012, accessed Nov. 28, 2016.*
"New Ninja Printer Plate for consumer 3D printing", dated Feb. 14, 2014, retrieved from the Internet: <http://www.3ders.org/articles/20140214-new-ninja-printer-plate-for-consumer-3d-printing.html>, 9 pages.
"3D Printing on Ninja Plate: Flexible Build Plate", dated Mar. 13, 2014, retrieved from the Internet: <https://blog.adafruit.com/2014/03/13/3d-printing-on-ninjaplate-flexible-build-plate/>, 7 pages.
"FLEKS3DTM Build-Plate System by Viktor Jondal & Peter Ragonetti—Kickstarter", retrieved from the Internet: <https://www.kickstarter.com/projects/fleks3d/fleks3dtm-build-plate-system>, 19 pages.

* cited by examiner

100

Printing a three dimensional item onto a build surface defined by a printer plate
105

Separate printed item from build surface
110

Clean build surface
115

FIG. 4

PRINTER PLATES FOR THREE DIMENSIONAL PRINTING

CROSS-REFERENCE TO RELATED APPLICATIONS

This application claims the benefit of U.S. Provisional Application No. 62/002,605, filed on May 23, 2014, and U.S. Provisional Application No. 62/041,243, filed on Aug. 25, 2014, both of which are incorporated herein by reference in their entirety.

FIELD

The subject matter described herein relates to three dimensional printing and, more particularly, surfaces onto which three dimensional objects are printed.

BACKGROUND

In three dimensional (3D) printing (also referred to as additive manufacturing), a three-dimensional solid object is made by laying down successive layers of material, typically onto a plate or other build surface. In recent years, the cost of home 3D printers has decreased, resulting in increased home use. It is predicted that consumer 3D printing will grow exponentially in the coming decades.

SUMMARY

In one respect, the present disclosure is directed to a printer plate for three dimensional printing. The printer plate can include a base layer. The base layer can have a first face and a second face. The first face can be opposite to the second face. The printer plate can also include a first outer layer operatively connected to the first face of the base layer. The first outer layer can have an outer surface that defines a first build surface of the printer plate. The first outer layer can be made of a different material than the base layer. The first outer layer can be at least partially made of an uncross-linked methyl methacrylate-based acrylic resin, a reinforced acrylic resin, an acrylic resin impregnated laminate, or polyetherimide.

In another respect, the present disclosure is directed to a printer plate for three dimensional printing. The printer plate can include a base layer that has a first face and a second face. The first face can be opposite to the second face. The printer plate can include a first outer layer. The first outer layer can be operatively connected to the first face of the base layer. The first outer layer can have an outer surface that defines a first build surface of the printer plate. The printer plate can include a second outer layer. The second outer layer can be operatively connected to the second face of the base layer. The second outer layer can have an outer surface that defines a second build surface of the printer plate. The first outer layer and the second outer layer can both be made of a material that is different than the material base layer. The first outer layer and/or the second outer layer can be at least partially made of an uncross-linked methyl methacrylate-based acrylic resin, a reinforced acrylic resin, an acrylic resin impregnated laminate, or polyetherimide.

BRIEF DESCRIPTION OF THE DRAWINGS

FIG. 4 is an example of a method of three dimensional printing.

DETAILED DESCRIPTION

Figure 1:
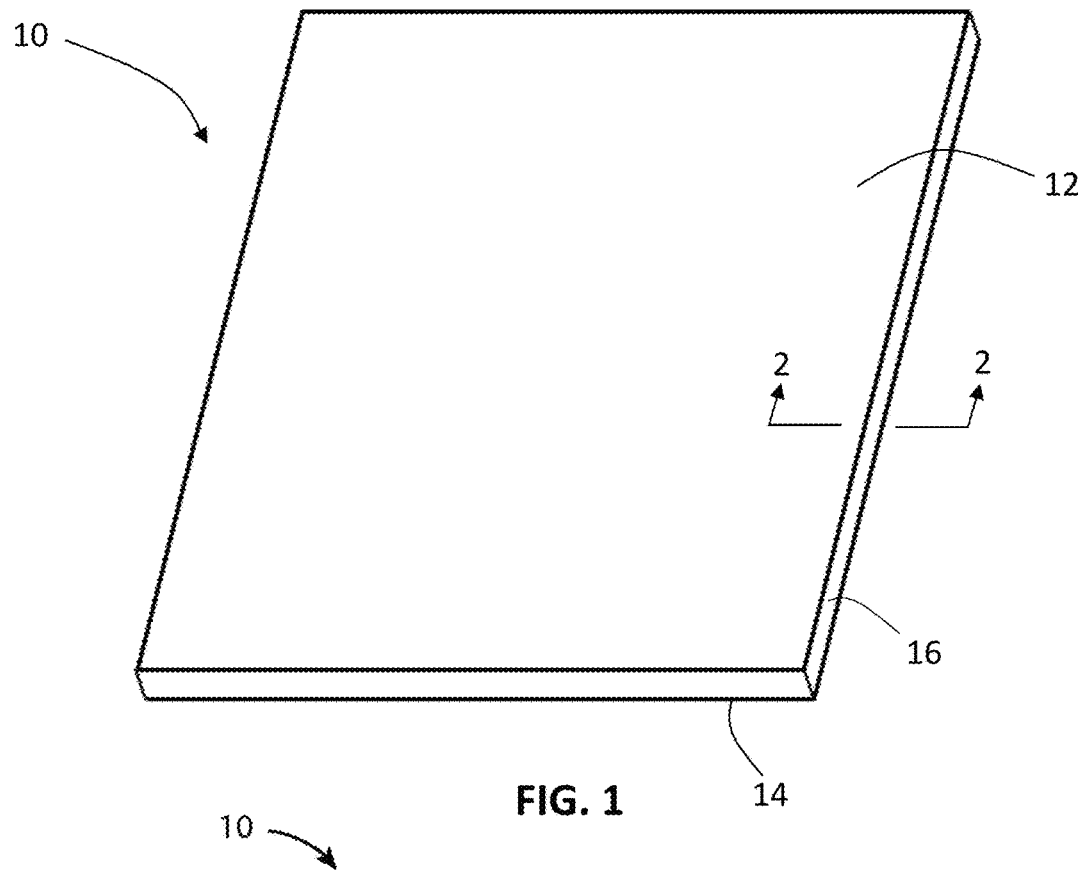
FIG. 1 is an example of a printer plate.

Arrangements described herein relate to printer plates for 3D printing/additive manufacturing and related systems, methods, kits, and/or apparatus. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of embodiments and aspects herein. Arrangements are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 2:
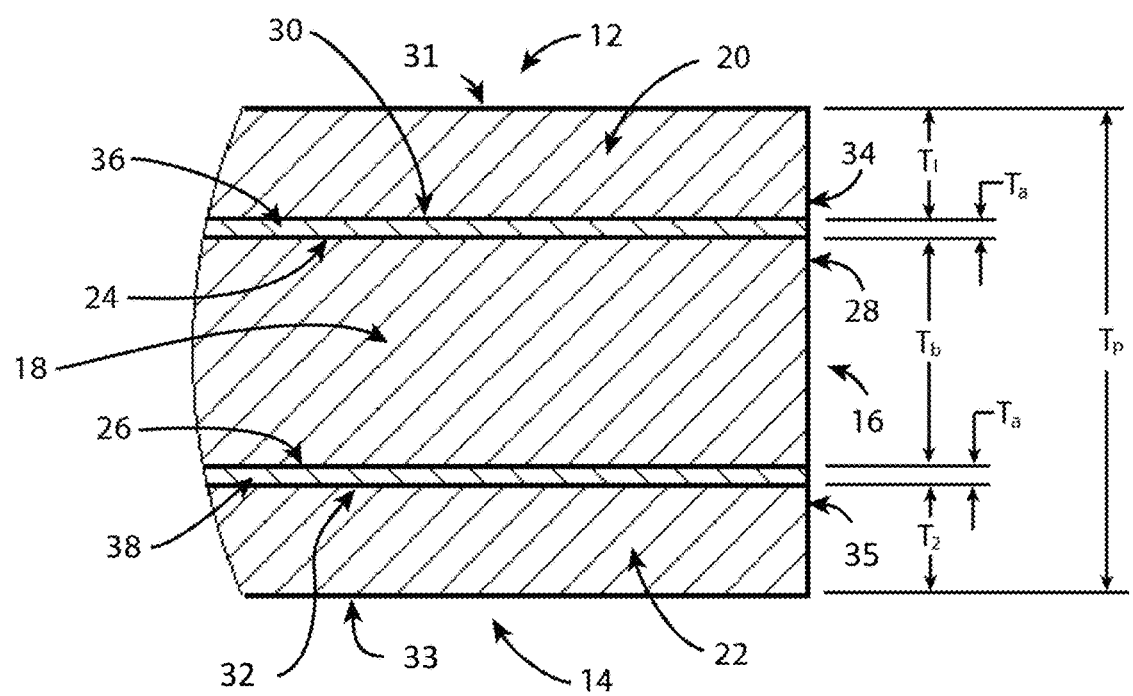
FIG. 2 is a cross-sectional view of a portion of the printer plate, viewed along line 2-2 in FIG. 1.

Referring to FIGS. 1 and 2, an example of a printer plate 10 is shown. "Printer plate" means any base or substrate defining a surface upon which processes are carried out and, more particularly, upon which an object is formed in a three dimensional printing/additive manufacturing process.

The printer plate 10 can have a first major face 12 and an opposite second major face 14. The first major face 12 and/or the second major face 14 can be substantially planar. As used herein, the term "substantially" includes exactly the term it modifies and slight variations therefrom, such as, for example, within normal manufacturing tolerances. Thus, the term "substantially planar" means exactly planar and slight variations therefrom. The first and second major faces 12, 14 can be substantially parallel to each other. The first and second major faces 12, 14 of the printer plate 10 can be substantially identical to each other. Alternatively, the first major face 12 can be different from the second major face 14 in one or more respects.

The printer plate 10 can include one or more sidewalls 16. In one or more arrangements, the one or more sidewalls 16 can be substantially planar. In one or more arrangements, the one or more sidewalls 16 can be non-planar. In one or more arrangements, the one or more sidewalls 16 can be substantially perpendicular to the first major face 12 and/or the second major face 14. In one or more arrangements, the one or more sidewalls 16 can be non-perpendicular to the first major face 12 and/or the second major face 14.

In one or more arrangements, the first major face 12 can define a first build surface of the printer plate 10. Alternatively or in addition, in one or more arrangements, the second major face 14 can define a second build surface of the printer plate 10.

The printer plate 10 can have an associated thickness Tp (FIG. 2). The thickness Tp of the printer plate 10 can be substantially uniform. In one or more arrangements, the thickness Tp of the printer plate 10 can be about 0.132 inches nominal. In one or more arrangements, the thickness Tp of the printer plate 10 can be about 0.17 inches nominal. However, it will be understood that arrangements are not limited to this example. In one or more arrangements, the thickness Tp of the printer plate 10 can vary in one or more local areas. In one or more arrangements, the thickness Tp of the printer plate 10 can vary in one or more directions across at least a portion of the printer plate 10.

The printer plate 10 can have any suitable shape. In one or more arrangements, the printer plate 10 can be substantially rectangular. However, it will be understood that the printer plate 10 is not limited to this shape. Indeed, the printer plate 10 can be substantially circular, substantially triangular, substantially oval, substantially parallelogram, substantially polygonal, or substantially trapezoidal, just to name a few possibilities. In some instances, the printer plate 10 can have an irregular shape.

The printer plate 10 can be flexible, which can allow the printer plate 10 to be bowed or otherwise flexed. For instance, the printer plate 10 can flex slightly (e.g. bow) when force is directly and/or indirectly applied (e.g. by hand or otherwise) on opposing side regions of the printer plate 10. The printer plate 10 can return to a substantially non-flexed or a substantially non-bowed form upon discontinuation of the application of the force.

The printer plate 10 includes a plurality of layers. In particular, the printer plate 10 can include a base layer 18 and a first outer layer 20. In some instances, the printer plate 10 can include a second outer layer 22. Each of these layers will be described in turn below.

The base layer 18 can have any suitable shape. The base layer 18 can have a first face 24 and an opposite second face 26. The first face 24 and/or the second face 26 can be substantially planar. The first face 24 and the second face 26 can be substantially parallel to each other. In one or more arrangements, the first face 24 and the second face 26 can be non-parallel to each other.

The base layer 18 can include one or more sidewalls 28. In one or more arrangements, the one or more sidewalls 28 can be substantially planar. In one or more arrangements, the one or more sidewalls 28 can be non-planar. In one or more arrangements, the one or more sidewalls 28 can be substantially perpendicular to the first face 24 and/or the second face 26. In one or more arrangements, the one or more sidewalls 28 can be non-perpendicular to the first face 24 and/or the second face 26.

The base layer 18 can have an associated thickness Tb. The thickness Tb of the base layer 18 can be substantially uniform. In one or more arrangements, the thickness Tb of the base layer 18 can be about 0.062 inches nominal. However, it will be understood that arrangements are not limited to this example. In one or more arrangements, the thickness Tb of the base layer 18 can vary in one or more local areas. In one or more arrangements, the thickness Tb of the base layer 18 can vary in one or more directions across at least a portion of the base layer 18.

The base layer 18 can comprise any suitable percentage of the overall thickness Tp of the printer plate 10. For example, in one or more arrangements, the thickness Tb of the base layer 18 can be from about 40% to about 60% of the thickness Tp of the printer plate 10. In one or more arrangements, the thickness Tb of the base layer 18 can be from about 40% to about 50% of the thickness Tp of the printer plate 10. Still more particularly, the thickness Tb of the base layer 18 can be from about 45% to about 48% of the thickness Tp of the printer plate 10.

As another example, in one or more arrangements, the thickness Tb of the base layer 18 can be from about 25% to about 50% of the thickness Tp of the printer plate 10. In one or more arrangements, the thickness Tb of the base layer 18 can be from about 30% to about 400% of the thickness Tp of the printer plate 10. Still more particularly, the thickness Tb of the base layer 18 can be from about 35% to about 37% of the thickness Tp of the printer plate 10. Further, the thickness Tb of the base layer 18 can be about 36% of the thickness Tp of the printer plate 10. It will be understood that the thicknesses and the relative thicknesses described herein are provided merely as examples, and embodiments are not limited to these examples.

The base layer 18 can have any suitable characteristics, including one or more of the characteristics described herein. For instance, the base layer 18 can be semi-rigid. That is, the base layer 18 can be rigid at rest while permitting some flexibility when a load is applied thereto. More particularly, the base layer 18 can flex slightly (e.g. bow) when force is directly and/or indirectly applied (e.g. by hand or otherwise) on opposing side regions of the base layer 18. However, when the force is removed, the base layer 18 can substantially return to its normal, non-flexed form.

The base layer 18 can have an associated coefficient of thermal expansion (CTE). In one or more arrangements, the base layer 18 can have a low CTE. As an example, the base layer 18 can have a CTE of about 20 ppm/° C. or less.

The base layer 18 can be made of any suitable material, including plastics, metals, glass, alloys and/or other materials. As an example, the base layer 18 can be made of a glass-epoxy material. As another example, the base layer 18 can be made of a glass-epoxy printed circuit board. Still further, the base layer 18 can be a composite material composed of woven fiberglass cloth with an epoxy resin binder. In one or more arrangements, the base layer 18 can be glass-reinforced epoxy laminate having an FR4 or G10 grade designation. In one or more arrangements, the base layer 18 can be made of a material that it allows it to be machined using any suitable machining technique, including conventional machining.

As noted above, the printer plate 10 can include a first outer layer 20 and, in at least some instances, a second outer layer 22. The first outer layer 20 and/or the second outer layer 22 can have any suitable shape. The first outer layer 20 can have an inner face 30 and an opposite outer face 31. The second outer layer 22 can have an inner face 32 and an opposite outer face 33. The terms "inner" and "outer" are used in connection with the first and second outer layers 20, 22 to note the position of the respective face relative to the base layer 18. However, it will be understood that these terms are used for convenience and are not intended to be limiting.

The inner face 30 and/or the outer face 31 of the first outer layer 20 can be substantially planar. Alternatively or in addition, the inner face 32 and/or the outer face 33 of the second outer layer 22 can be substantially planar. In one or more arrangements, the inner and outer faces 30, 31 of the first outer layer 20 can be substantially parallel to each other. In one or more arrangements, the inner and outer faces 30, 31 of the first outer layer 20 can be non-parallel to each other. In one or more arrangements, the inner and outer faces 32, 33 of the second outer layer 22 can be substantially parallel to each other. In one or more arrangements, the inner and outer faces 30, 31 of the first outer layer 20 can be non-parallel to each other.

The first outer layer 20 can include one or more sidewalls 34. In one or more arrangements, the one or more sidewalls 34 can be substantially planar. In one or more arrangements, the one or more sidewalls 34 can be non-planar. In one or more arrangements, the one or more sidewalls 34 can be substantially perpendicular to the inner face 30 and/or the outer face 31 of the first outer layer 20. In one or more arrangements, the one or more sidewalls 34 can be non-perpendicular to the inner face 30 and/or the outer face 31 of the first outer layer 20.

Alternatively or in addition, the second outer layer 22 can include one or more sidewalls 35. In one or more arrangements, the one or more sidewalls 35 can be substantially planar. In one or more arrangements, the one or more sidewalls 35 can be non-planar. In one or more arrangements, the one or more sidewalls 35 can be substantially perpendicular to the inner face 32 and/or the outer face 33 of the second outer layer 22. In one or more arrangements, the one or more sidewalls 35 can be non-perpendicular to the inner face 32 and/or the outer face 33 of the second outer layer 22.

The first outer layer 20 can have an associated thickness T1. The second outer layer 22 can have an associated thickness T2. The first outer layer 20 and the second outer layer 22 can have any suitable thickness. For instance, in one or more implementations, the thickness T1 of the first outer layer 20 and/or the thickness T2 of the second outer layer 22 can be about 0.030 inches nominal. As another example, in one or more implementations, the thickness T1 of the first outer layer 20 and/or the thickness T2 of the second outer layer 22 can be about 0.050 inches nominal. In one or more arrangements, the thickness TL of the first outer layer 20 and/or the thickness T2 of the second outer layer 22 can be substantially uniform. In one or more arrangements, the thickness T1 of the first outer layer 20 and/or the thickness T2 of the second outer layer 22 can be non-uniform. For instance, in one or more arrangements, the thickness T1 of the first outer layer 20 and/or the thickness T2 of the second outer layer 22 can vary in one or more local areas. In one or more arrangements, the thickness T1 of the first outer layer 20 and/or the thickness T2 of the second outer layer 22 can vary in one or more directions across at least a portion of the respective outer layer 20, 22.

In one or more arrangements, the thickness T1 of the first outer layer 20 and the thickness T2 of the second outer layer 22 can be substantially the same. In one or more arrangements, the thickness T1 of the first outer layer 20 and the thickness T2 of the second outer layer 22 can be different from each other.

The first outer layer 20 and/or the second outer layer 22 can comprise any suitable percentage of the overall thickness Tp of the printer plate 10. For instance, in one or more arrangements, the thickness T1 of the first outer layer 20 can be from about 15% to about 30% of the thickness Tp of the printer plate 10, and/or the thickness T2 of the second outer layer 22 can be from about 15% or about 30% of the thickness Tp of the printer plate 10. More particularly, the thickness T1 of the first outer layer 20 can be from about 20% to about 25% of the thickness Tp of the printer plate 10, and/or the thickness T2 of the second outer layer 22 can be from about 20% to about 25% of the thickness Tp of the printer plate 10.

In one or more arrangements, the thickness T1 of the first outer layer 20 can be from about 20% to about 40% of the thickness Tp of the printer plate 10, and/or the thickness 12 of the second outer layer 22 can be from about 20% or about 40% of the thickness Tp of the printer plate 10. More particularly, the thickness T1 of the first outer layer 20 can be from about 25% to about 35% of the thickness Tp of the printer plate 10, and/or the thickness T2 of the second outer layer 22 can be from about 25% to about 35% of the thickness Tp of the printer plate 10. Still more particularly, the thickness T1 of the first outer layer 20 can be about 30% of the thickness Tp of the printer plate 10, and/or the thickness T2 of the second outer layer 22 can be about 30% of the thickness Tp of the printer plate 10.

The first outer layer 20 and/or the second outer layer 22 can comprise any suitable percentage of the thickness Tb of the base layer 18. In one or more arrangements, the thickness T1 of the first outer layer 20 can be from about 40% to about 50% of the thickness Tb of the base layer 18, and/or the thickness 12 of the second outer layer 22 can be from about 40% to about 50% of the thickness Tb of the base layer 18. More particularly, the thickness T1 of the first outer layer 20 can be from about 48% to about 50% of the thickness Tb of the base layer 18, and/or the thickness T2 of the second outer layer 22 can be from about 48% to about 50% of the thickness Tb of the base layer 18.

In one or more arrangements, the thickness T1 of the first outer layer 20 can be from about 62% to about 100% of the thickness Tb of the base layer 18, and/or the thickness T2 of the second outer layer 22 can be from about 62% to about 100% of the thickness Tb of the base layer 18. More particularly, the thickness T1 of the first outer layer 20 can be from about 70% to about 91% of the thickness Tb of the base layer 18, and/or the thickness T2 of the second outer layer 22 can be from about 70% to about 91% of the thickness Tb of the base layer 18. Still more particularly, the thickness T1 of the first outer layer 20 can be from about 78% to about 83% of the thickness Tb of the base layer 18, and/or the thickness T2 of the second outer layer 22 can be from about 78% to about 83% of the thickness Tb of the base layer 18. The thickness T1 of the first outer layer 20 can be about 80% of the thickness Tb of the base layer 18, and/or the thickness T2 of the second outer layer 22 can be about 80% of the thickness Tb of the base layer 18.

It will be understood that the thicknesses and the relative thicknesses described herein are provided merely as examples and arrangements are not limited to these examples. Indeed, it will be appreciated that these thicknesses may vary depending on at least in part the particular materials selected for the first outer layer 20, the second outer layer 22, and/or the base layer 18.

The first outer layer 20 and/or the second outer layer 22 can be made of any suitable material. For instance, the first outer layer 20 and/or the second outer layer 22 can be at least partially made of an acrylic resin. In one or more arrangements, the first outer layer 20 and/or the second outer layer 22 can be at least partially made of an uncross-linked methyl methacrylate-based acrylic resin. In one or more arrangements, the first outer layer 20 and/or the second outer layer 22 can be at least partially made by casting an uncross-linked methyl methacrylate-based acrylic resin at elevated temperature(s) and/or pressure(s). The first outer layer 20 and/or the second outer layer 22 can be reinforced with one or more suitable reinforcing materials. For instance, the layer reinforcing material can be fiberglass cloth, nylon fabric reinforcement, and/or other type of reinforcing material. In one or more arrangements, the first outer layer 20 and/or the second outer layer 22 can be at least partially made of an acrylic resin impregnated laminate (e.g. a fiberglass laminate).

In one or more arrangements, the first outer layer 20 and/or the second outer layer 22 can be at least partially made of polyetherimide (PEI). For instance, the first outer layer 20 and/or the second outer layer 22 can be made of Ultem 1000, which is available from Saudi Basic Industries Corporation (SABIC), Pittsfield, Mass. The first outer layer 20 and/or the second outer layer 22 can be made of any suitable material(s) that can provide appropriate adhesion characteristics for printing. Alternatively or in addition, the first outer layer 20 and/or the second outer layer 22 can be made of one or more materials that are flexible and/or that can return to a substantially flat and/or substantially planar condition after being flexed or bowed.

It should be noted that while certain suitable materials may include a specific number of plies or quantity of reinforcing material (e.g. reinforcement cloth), it will be understood that arrangements described herein are not limited to any particular number of plies or quantity of reinforcing material. Indeed, the material of the first outer layer 20 and/or the second outer layer 22 can include any suitable number of plies of reinforcing material or any suitable quantity of reinforcing material. Further, when the reinforcing material is provided in cloth form, the type of reinforcing cloth and/or the type of weave used on the cloth can be varied. Still further, the reinforcing material can be provided in any suitable form, including in non-cloth and/or non-ply forms.

In one or more arrangements, the first outer layer 20 and the second outer layer 22 can be made of the same material. In one or more arrangements, the first outer layer 20 and the second outer layer 22 can be made of different materials.

The first outer layer 20 and/or the second outer layer 22 can have any suitable characteristics, including one or more of the characteristics described herein. The first outer layer 20 and/or the second outer layer 22 can be configured to provide suitable adhesion characteristics. As an example, the material of the first outer layer 20 and/or the second outer layer 22 can adhere to printed plastic materials. In some arrangements, the material of the first outer layer 20 and/or the second outer layer 22 can be made of a material that can adhere to printed plastic materials without additional surface preparation, such as, for example, adhesives or special tapes. In one or more arrangements, the material of the first outer layer 20 and/or the second outer layer 22 can be sufficiently durable to allow at least their respective outer faces 31, 33 to be scraped, sanded, and/or treated with solvents to remove printed plastic therefrom without destroying the usefulness of the surface.

It will be appreciated that the base layer 18 along with the first outer layer 20 and/or the second outer layer 22 can cooperatively provide suitable characteristics for use in three dimensional printing. For instance, an acrylic resin impregnated laminate (or a thin sheet of PEI) may not provide an effective printing surface alone because it may lack sufficient rigidity at least because it is relatively thin. Some printed plastics contract while cooling, causing the laminate to curl. Consequently, the surface(s) of a printed part in contact with such a printing surface could become non-planar and potentially out of design specifications. However, according to arrangements herein, the attachment of the first outer layer 20 and/or the second outer layer 22 to the base layer 18 can provide rigidity to the printer plate 10 to prevent or minimize it from curling.

The first outer layer 20 and/or the second outer layer 22 can be attached to a respective one of the faces 24, 26 of the base layer 18 in any suitable manner. In one or more arrangements, the first outer layer 20 and/or the second outer layer 22 can be bonded to the base layer 18 in any suitable manner. As an example, the first outer layer 20 and/or the second outer layer 22 can be bonded to the base layer 18 using an adhesive transfer tape or other suitable adhesive.

The adhesive transfer tape or adhesive can be heat resistant sufficient to withstand the high temperatures of the material printed on the printer plate 10. The adhesive transfer tape or adhesive can have sufficient strength to resist delamination due to the shrinkage forces of the item being printed. The adhesive transfer tape or adhesive can be applied with a consistent bond line thickness between the base layer 18 and the respective outer layer 20, 22. In one or more arrangements, the adhesive transfer tape or adhesive can be sufficiently flexible to allow the printer plate 10 to bend or flex without debonding. In one or more arrangements, the adhesive transfer tape or adhesive can maintain sufficient adhesion strength up to at least about 120 degrees Celsius. In one or more arrangements, the adhesive transfer tape or adhesive, along with the plate itself, return to a flat or planar condition for printing after being flexed or bowed.

In one or more arrangements, the adhesive transfer tape or adhesive can be provided in one or more individual regions between the first outer layer 20 and the base layer 18 and/or in one or more individual regions between the second outer layer 22 and the base layer 18. In one or more arrangements, the adhesive transfer tape or adhesive can be provided across substantially the entire interface between first outer layer 20 and the base layer 18 so as to form a first adhesive layer 36 of the printer plate 10. In one or more arrangements, the adhesive transfer tape or adhesive can be provided across substantially the entire interface between second outer layer 22 and the base layer 18 so as to form a second adhesive layer 38 of the printer plate 10.

The first and/or second adhesive layers 36, 38 can have an associated thickness Ta. The thickness Ta of the first outer layer 36 and/or the thickness Ta of the second adhesive layer 38 can be substantially uniform. In one or more arrangements, the thickness Ta of the first adhesive layer 36 and/or the thickness Ta of the second adhesive layer 38 can be about 0.005 inches nominal. In one or more arrangements, the thickness Ta of the first outer layer 36 and/or the thickness Ta of the second adhesive layer 38 can be non-uniform. For instance, in one or more arrangements, the thickness Ta of the first outer layer 36 and/or the thickness Ta of the second adhesive layer 38 can vary in one or more local areas. In one or more arrangements, the thickness Ta of the first outer layer 36 and/or the thickness Ta of the second adhesive layer 38 can vary in one or more directions across at least a portion of the respective adhesive layer 36, 38. The first adhesive layer 36 and/or the second adhesive layer 38 can comprise any suitable percentage of the overall thickness Tp of the printer plate 10. For instance, in one or more arrangements, the thickness Ta of the first adhesive layer 36 and/or the thickness Ta of the second adhesive layer 38 can be from about 1% to about 5% of the thickness Tp of the printer plate 10. More particularly, the thickness Ta of the first adhesive layer 36 and/or the thickness Ta of the second adhesive layer 38 can be from about 3% to about 4% of the thickness Tp of the printer plate 10.

The first adhesive layer 36 and/or the second adhesive layer 38 can comprise any suitable percentage of the thickness Tb of the base layer 18. In one or more arrangements, the thickness Ta of the first adhesive layer 36 and/or the thickness Ta of the second adhesive layer 38 can be from about 5% to about 10% of the thickness Tb of the base layer 18. More particularly, thickness Ta of the first adhesive layer 36 and/or the thickness Ta of the second adhesive layer 38 can be about 8% of the thickness Tb of the base layer 18.

It will be understood that the thicknesses and the relative thicknesses described herein are provided merely as examples and arrangements are not limited to these examples. Indeed, it will be appreciated that these thicknesses may vary depending on at least in part the particular materials selected for the first outer layer 20, the second outer layer 22, the base layer 18, the first adhesive layer 36, and/or the second adhesive layer 38.

In one or more arrangements, the material of the first adhesive layer 36 and the second adhesive layer 38 can be substantially identical. In one or more arrangements, the material of the first adhesive layer 36 and the second adhesive layer 38 can be different.

It will be appreciated that the outer face 31 of the first outer layer 20 can define the first major face 12 of the printer plate 10. In arrangements in which the printer plate 10 also includes a second outer layer 22, the outer face 33 of the second outer layer 22 can define the second major face 14 of the printer plate 10. Alternatively, in arrangements in which the printer plate 10 does not include a second outer layer 22, the second face 26 of the base layer 18 can define the second major face 14 of the printer plate 10.

Figure 5:
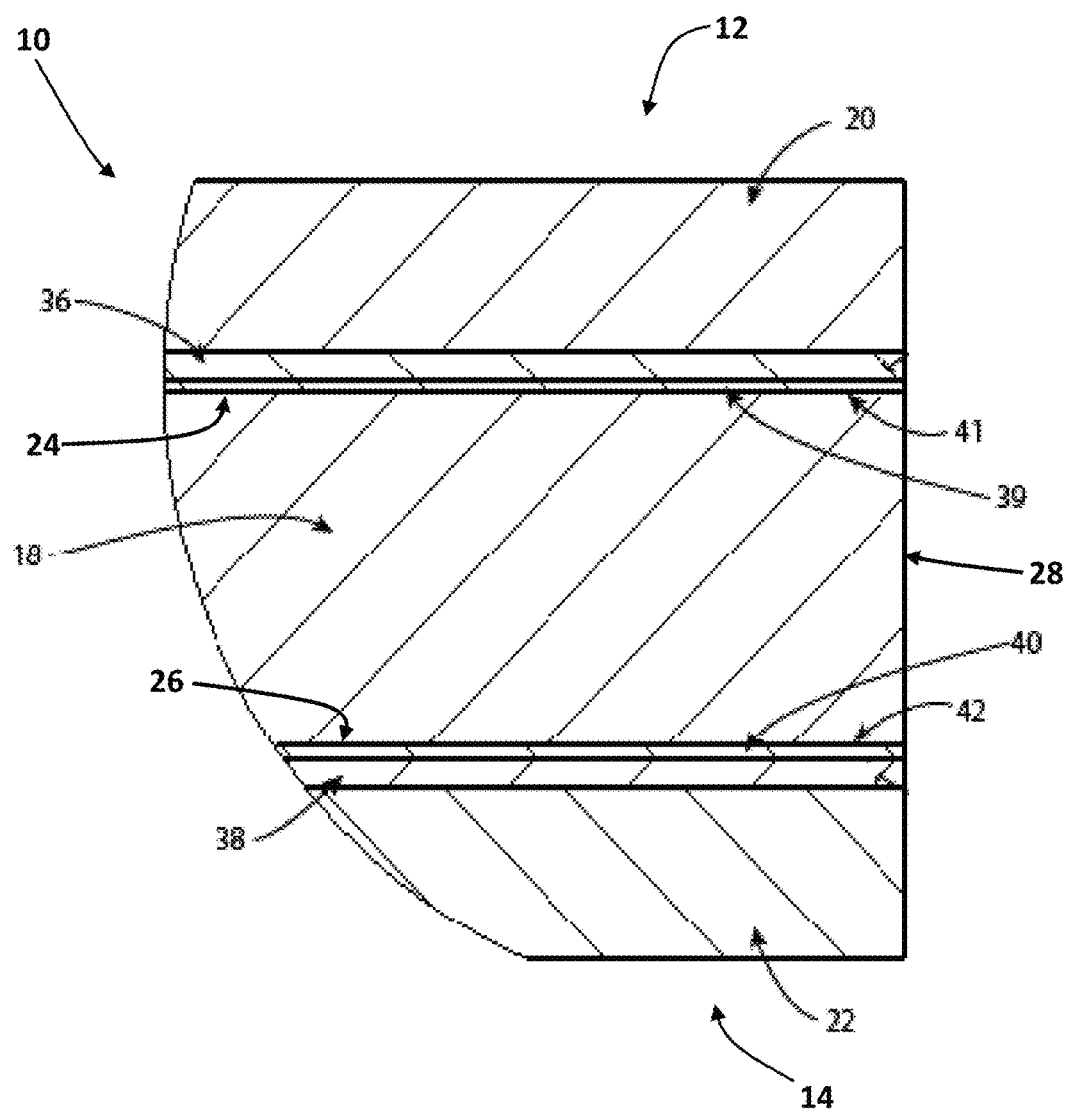
FIG. 5 is a cross-sectional view of a portion of a printer plate, showing a first intermediate layer located between a base layer and a first outer layer and a second intermediate layer located between the base layer and a second outer layer of the printer plate.

FIG. 5 shows an arrangement in which the printer plate 10 can include a first intermediate layer 39. The first intermediate layer 39 can be located between the base layer 18 and the first outer layer 20 of the printer plate 10. Alternatively or in addition, the printer plate 10 can include a second intermediate layer 40. The second intermediate layer 40 can be located between the second intermediate layer 40 and the base layer 18. At least a portion of the base layer 18 can be at least partially covered by and/or coated with a respective intermediate layer 39, 40. The first and second intermediate layers 39, 40 can be made of any suitable material. For instance, in one or more arrangements, the first intermediate layer 39 and/or the second intermediate layer 40 can be made of a conductive material. In one or more arrangements, the first intermediate layer 39 and/or the second intermediate layer 40 can be made of metal, such as copper. In one or more arrangements, the base layer 18 can be a copper clad printed circuit board. In such case, the first intermediate layer 39 and the second intermediate layer 40 can be defined by the copper cladding. In one or more arrangements, the first intermediate layer 39 and/or the second intermediate layer 40 can be made of metal foil, such as, for example, a copper foil.

In one or more arrangements, the first face 24 and/or the second face 26 of the base layer 18 can be at least partially covered by and/or at least partially coated with the first intermediate layer 39 and the second intermediate layer 40, respectively. In one or more arrangements, the first face 24 and/or the second face 26 of the base layer 18 can be substantially entirely covered by and/or substantially entirely coated with the first intermediate layer 39 and the second intermediate layer 40, respectively. In one or more arrangements, an intermediate layer may be provided on only one of the first face 24 or the second face 26 of the base layer 18. For instance, the first intermediate layer 39 may be provided on the first face 24 of the base layer 18, but an intermediate layer is not provided on or otherwise associated with the second face 26 of the base layer 18.

In arrangements in which the intermediate layer 39, 40 is provided on both the first face 24 and the second face 26 of the base layer 18, the area that the first intermediate layer 39 covers or coats the first face 24 can be substantially identical to the area that the second intermediate layer 40 covers or coats the second face 26. However, in other arrangements, the area that the first intermediate layer 39 covers or coats the first face 24 can be different from the area that the second intermediate layer 40 covers or coats the second face 26.

Further, the material of the first intermediate layer 39 associated with the first face 24 can be the same as the material of the second intermediate layer 40 associated with the second face 26. Alternatively, the material of the first intermediate layer 39 associated with the first face 24 can be different from the material of the second intermediate layer 40 associated with the second face 26.

One or more of the sidewalls 28 of the base layer 18 can be at least partially coated with and/or at least partially covered by a material. Such material can be the same as the material of the first intermediate layer 39 that at least partially covers and/or at least partially coats the first face 24 of the base layer 18. Alternatively or in addition, such material can be the same as the material of the second intermediate layer 40 that at least partially covers and/or at least partially coats the second face 26 of the base layer 18. Alternatively, the material can be different from the material of the first intermediate layer 39 that at least partially covers and/or at least partially coats the first face 24 and/or the material of the second intermediate layer 40 that at least partially covers and/or at least partially coats the second face 26 of the base layer 18. In one or more arrangements, the one or more sidewalls 28 of the base layer 18 may not be covered or coated by another material.

The first intermediate layer 39 and/or the second intermediate layer 40 can be attached to the base layer 18 in any suitable manner. For instance, the first intermediate layer 39 and/or the second intermediate layer 40 can be bonded to the base layer 18. Alternatively, the first intermediate layer 39 and/or the second intermediate layer 40 can be foil bonded with an adhesive layer at the respective interface 41, 42 with the base layer 18. Still further, the first intermediate layer 39 and/or the second intermediate layer 40 can be etched or printed onto the base layer 18.

In one or more arrangements, the first intermediate layer 39 and/or the second intermediate layer 40 can be attached to the respective outer layer 20, 22 in any suitable manner. For instance, the first intermediate layer 39 and/or the second intermediate layer 40 can be attached to the respective outer layer 20, 22 by a suitable adhesive layer 36, 38, respectively. The above discussion of the adhesive layers 36, 38 applies to the attachment between the first intermediate layer 39 and the first outer layer 20 and/or the attachment between the second intermediate layer 40 and the second outer layer 22.

Figure 6:
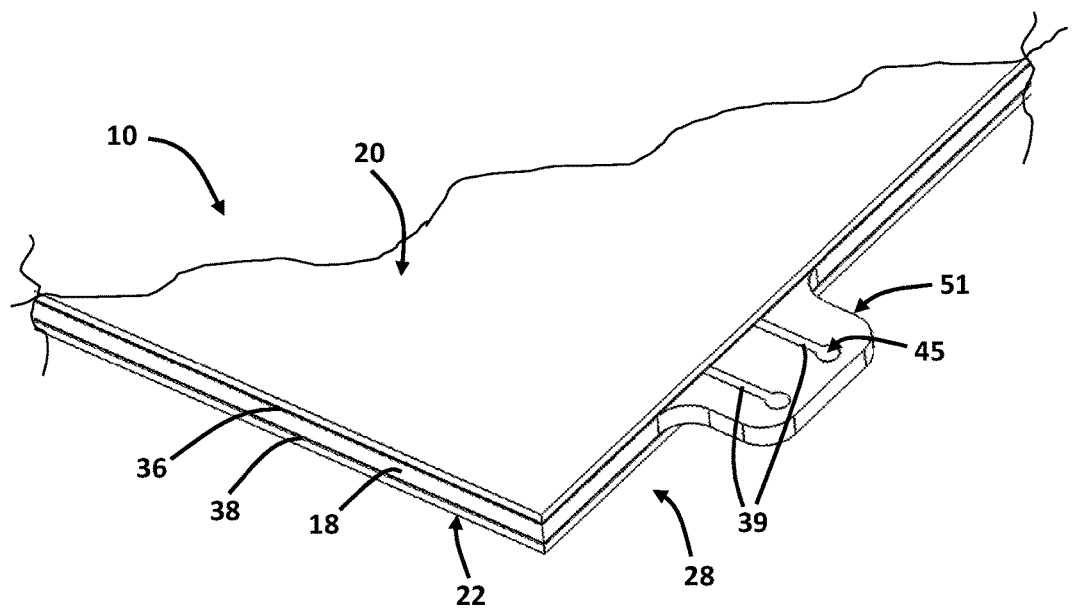
FIG. 6 is an example of a portion of a printer plate, showing a base layer that is configured to facilitate heating of the printer plate.

FIG. 6 is an example of a portion of a printer plate 10 having an alternative configuration to facilitate heating of the printer plate 10. In such arrangement, the base layer 18 can be configured to include a tab 51 that protrudes from a sidewall 28 of the printer plate 10. In such case, the intermediate layers 39, 40 (only the first intermediate layer 39 is visible in FIG. 6; intermediate layer 40 being located on the opposite side of the base layer 18) can be provided on the base layer 18 in any suitable manner to facilitate heating of the printer plate 10. For example, in one or more arrangements, the first intermediate layer 39 and/or the second intermediate layer 40 can be provided in a serpentine arrangement across at least a portion of the respective face 24, 26 of the base layer 18. At least a portion of the first intermediate layer 39 and/or the second intermediate layer can exposed (e.g. contact points 45) for operative connection to a power source (not shown), such as by connecting one or more conductors between the first intermediate layer 39 and the power source and/or between the second intermediate layer 40 and the power source. When power is applied to the first intermediate layer 39 and/or the second intermediate layer 40, the first intermediate layer 39 and/or the second intermediate layer 40 can be heated, which in turn can heat the printer plate 10.

Figure 7:
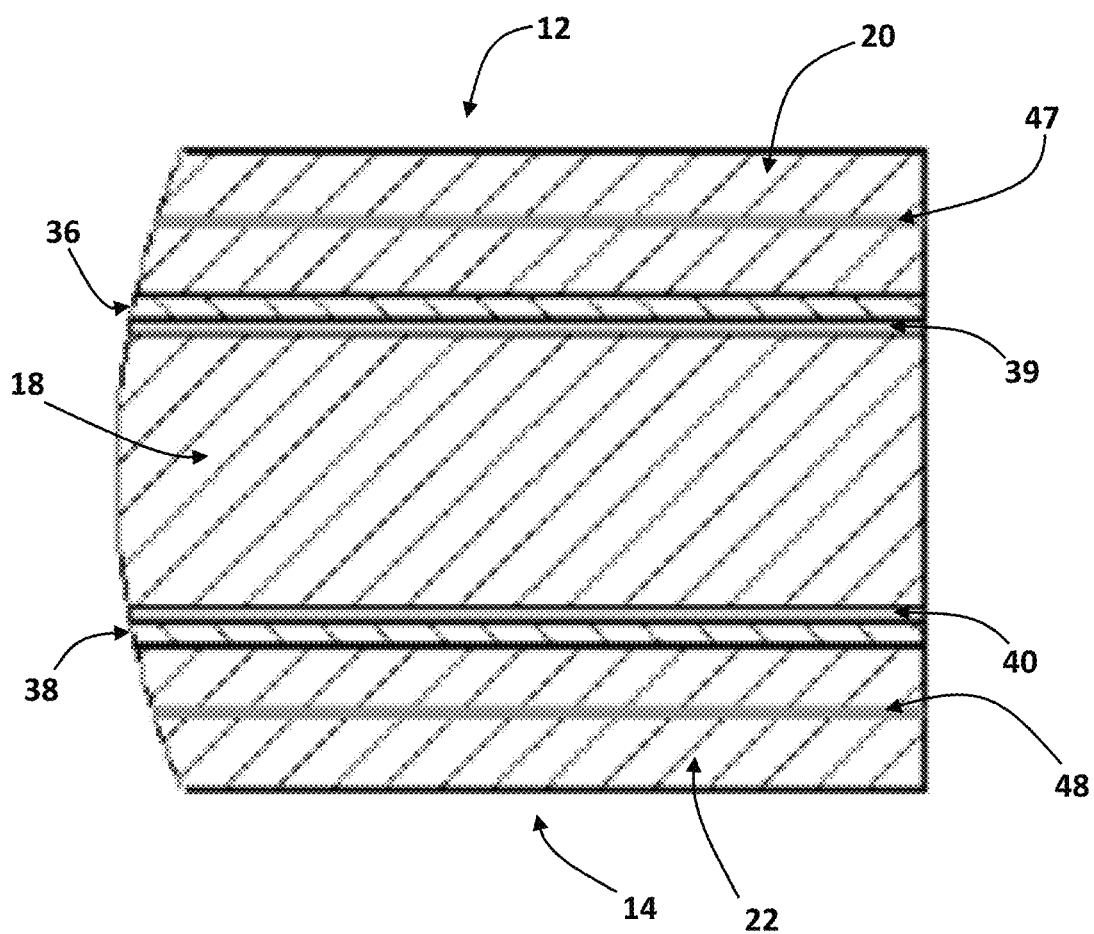
FIG. 7 is a cross-sectional view of a portion of a printer plate, showing a first outer layer that includes a first interlayer and a second outer layer that includes a second interlayer.

In one or more arrangements, the printer plate 10 can be configured to facilitate the use of 3D printers with sensors (e.g., inductive proximity sensors) for bed leveling. As an example, the first outer layer 20 and/or the second outer layer 22 can be configured to be more readily detected by such sensors. FIG. 7 shows an example of a portion of a printer plate 10 having such a configuration. As is shown, the first outer layer 20 can include a first interlayer 47, and/or the second outer layer 22 can include a second interlayer 48. The first interlayer 47 and/or the second interlayer 48 can be a single interlayer element. Alternatively, the first interlayer 47 and/or the second interlayer 48 can include a plurality of interlayer elements. In such case, the plurality of interlayer elements can be distributed in any suitable manner within the first outer layer 20 and/or the second outer layer 22 in any suitable manner.

The first interlayer 47 and/or the second interlayer 48 can be made of any suitable material. For instance, the first interlayer 47 and/or the second interlayer 48 can be made of a material that can be readily detected by a particular sensor (e.g., an inductive proximity sensor). For instance, the first interlayer 47 and/or the second interlayer 48 can be made of a ferrous metal. As an example, the first interlayer 47 and/or the second interlayer 48 can be made of steel or cobalt steel, just to name a few possibilities.

The first interlayer 47 and/or the second interlayer 48 can be provided in any suitable location within the respective outer layer 20, 22. For instance, the first interlayer 47 and/or the second interlayer 48 can be located substantially within a middle region of the thickness T1, T2 of the respective outer layer 20, 22. The first interlayer 47 and/or the second interlayer 48 can be located as close to the respective major face 12, 14 of the printer plate 10 as possible to facilitate detection. In one or more arrangements, the first interlayer 47 and/or the second interlayer 48 can be located between a middle region of the respective outer layer 20, 22 and the respective major face 12, 14 of the printer plate 10. For instance, the first interlayer 47 can be located between the middle of the first outer layer 20 and the first major face 12 of the printer plate 10.

In arrangements in which both the first outer layer 20 and the second outer layer 22 include a respective interlayer 47, 48, the first interlayer 47 can be substantially the same as the second interlayer 48. Alternatively, the first interlayer 47 can be different from the second interlayer 48 in one or more respects. For instance, the first interlayer 47 can be made of a different material than the second interlayer 48. Alternatively or in addition, the distance between the first major face 12 and the first interlayer 47 can be different from the distance between the second major face 14 and the second interlayer 48.

It should be noted that FIG. 7 shows an arrangements in which the first interlayer 47 and the second interlayer 48 extend substantially entirely across the entire first outer layer 20 and the second outer layer 22, respectively. However, it will be understood that arrangements are not limited in this respect. Indeed, the first interlayer 47 and/or the second interlayer 48 can extend across only a portion of the entire first outer layer 20 or the second outer layer 22, respectively.

Figure 3:
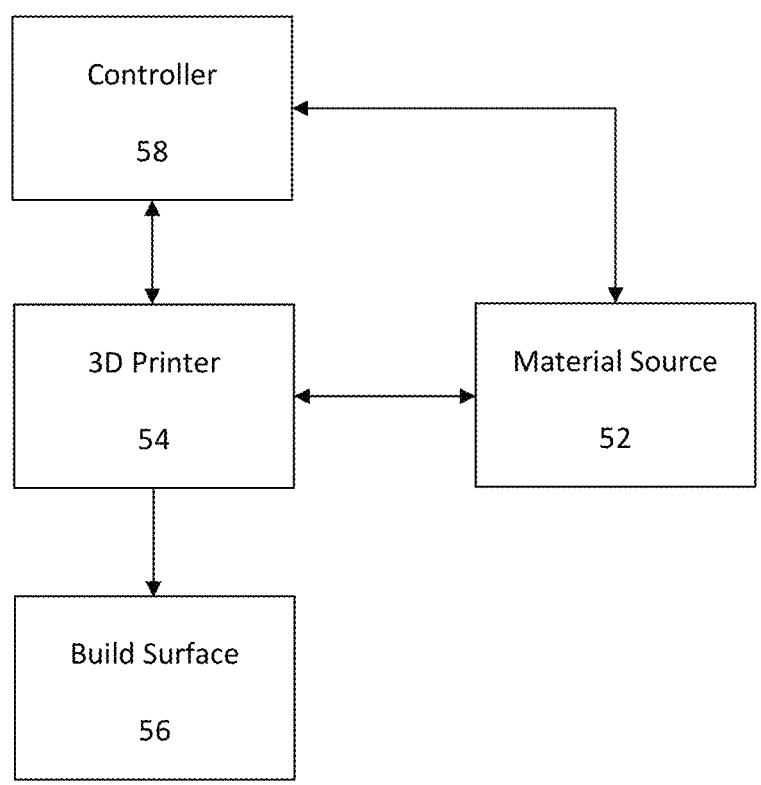
FIG. 3 is an example of a system for three dimensional printing.

FIG. 3 is a block diagram illustrating at least some of the elements of a system 50 for three dimensional printing using one or more printer plates 10 described herein. The system 50 can include one or more material sources 52, one or more 3D printers 54, and one or more build surfaces 56. The one or more material sources 52 can be operatively connected to supply a suitable material to the one or more 3D printers 54 for printing an item onto the build surface 56. As used herein, the term "operatively connected" can include direct or indirect connections, including connections without direct physical contact. The material source 52 can include any suitable material in any suitable form, including, for example, filament, cartridges, pellets, powder, and/or any other form now known or later developed. The material can be provided in any suitable state. In one or more arrangements, the material can be in a molten state. While not shown, the system 50 can include additional elements commonly associated with three dimensional printing, such as one or more computing devices, databases, modeling software, etc.

As used herein, the term "3D printer" or "three dimensional printer" is defined as one or more devices, one or more components, one or more systems, and/or one or more elements that can form a three-dimensional object by laying down successive layers of material onto a build surface. The 3D printer 54 can be any suitable printer for 3D printing or additive manufacturing. For instance, the 3D printer can be an extrusion, wire, granular, powder bed and inject head, lamination or polymerization type 3D printer, just to name a few possibilities.

The 3D printer 54 can print onto the build surface 56. The build surface 56 can be defined by a printer plate 10 as described above. In one or more arrangements, the printer plate 10 can be mounted or supported on a machine bed, build table, or other existing build surface of the 3D printer 54. In one or more arrangements, the printer plate 10 can be configured to partly or entirely replace the machine bed, build table or other build surface that is normally used, supplied and/or associated with the 3D printer 54. In one or more arrangements, the machine bed, build table, or the 3D printer can be configured to receive the printer plate 10. For instance, the machine bed, build table, or the 3D printer can include channels configured to receive a portion of the printer plate 10. In one or more arrangements, a pair of opposing channels can be provided. The printer plate 10 can be slideable within the channels. In one or more arrangements, the machine bed, build table, or the 3D printer, or the channels thereof, can be configured to bias the printer plate 10 in a particular direction (e.g., in a vertically upward direction). For instance, the machine bed, build table, or the 3D printer, or the channels thereof, can include one or more spring elements. The one or more spring elements can be any suitable type of spring.

The system 50 can include a controller 58 operatively connected to the 3D printer 54 and/or the material source 52. The controller 58 can be comprised of any suitable combination of hardware and/or software. The controller 58 can be operatively connected to selectively activate or deactivate the 3D printer 54 and/or the material source 52 in any suitable manner. The 3D printer 54 and/or the controller 58 can be configured to receive commands from one or more elements of the system 50. Such commands can include a model of the item to be printed. The 3D printer 54 and/or the controller 58 can be configured to process such commands to print an item based on the model thereof. The 3D printer 54 can print the item using any suitable material or combination of materials.

Now that the various aspects of the printer plate and associated 3D printing system have been described, various methods of using the printer plate will now be presented. Various possible methods of use will be described. The methods of use described may be applicable to the embodiments described in relation to FIGS. 1-3 and/or 5-7, but it is understood that the method can be carried out with other suitable systems and arrangements. Moreover, the method may include other steps that are not described, and in fact, the methods are not limited to including every step described herein. Moreover, the described steps are not limited to the particular chronological order described. Indeed, some of the steps may be performed in a different order than what is described and/or at least some of the steps described can occur simultaneously.

FIG. 4 is an example of method 100 of three dimensional printing. At block 105, a three dimensional item can be printed onto a build surface. Such printing can be performed using any suitable three dimensional printing or additive manufacturing process. Such processes can include the depositing of one or more layers of material onto a build surface. The build surface can be defined by a printer plate, such as the printer plate 10 described herein. The printer plate 10 can be supported on any suitable structure, such as a build table or other support surface. In some arrangements, printing onto the printer plate 10 can be performed without any surface preparation of the printer plate 10. In other arrangements, the build surface defined by the printer plate 10 can be prepared in any suitable manner. In some instances, the printer plate 10 can be heated, as some materials used for 3D printing may benefit from a heated build surface.

The printed item can be allowed to sufficiently cool (e.g. based on material properties and/or a suitable amount of time). At block 110, the printed item can be separated from the build surface. The separation can be performed in any suitable manner. For instance, the printer plate 10 and/or the printed item can be manipulated such that the printed item separates from the printer plate 10. Any suitable manipulation can be employed. As an example, the printer plate 10 can be flexible, as described above, allowing it to be bowed or otherwise flexed. Thus, the printer plate 10 can be flexed to facilitate removal of printed part from the printer plate 10. The separation can be performed manually and/or in one or more automated processes. In some instances, the separation may occur without manipulation because, as the printed part cools, it may separate from the printer plate 10 on its own. In some instances, a tool (e.g., a scraper, a spatula, etc.) may be used to scrape the printed part from the printer plate 10.

At block 115, the build surface 56 can be cleaned, as there may be excess material or splatter remaining on the build surface 56 after separation of the printed item. The cleaning can be performed in any suitable manner. The printer plate 10 can have durable surfaces, permitting the surfaces to be scraped clean or even sanded to remove stubborn material and/or improve surface finish. The cleaning can include wiping the build surface with solvents and/or other suitable substances.

Printer plates configured and used in accordance with the above can provide numerous benefits. For instance, the outer layer promotes adhesion of typical 3D printing materials to the printer plate without the need for common surface preparations (tape, hairspray, glue, etc.) in at least some instances. The printer plate can be flexible, thereby facilitating removal of 3D printed parts from the plate. The combination of a flexible printer plate with a high-adhesion build surface can improve the yield of successful prints without significantly adding to the cost or set-up time and may even reduce set-up or preparation time.

Printer plates described herein can provide suitable thermal conductivity characteristics (e.g. a low coefficient of thermal expansion), allowing the printer plates to be heated. This aspect is beneficial because some materials (e.g. ABS) may benefit from a heated build surface. The printer plates can be easily machined (e.g. by routing, sawing, drilling and/or other suitable machining methods) to provide multiple sizes or custom configurations at reasonable cost. Further, the printer plates have durable surfaces, facilitating cleaning of the build surface.

Further, in some arrangements, such as in the arrangement shown in FIG. 5, the printer plate can include one or more conductive intermediate layers. Such intermediate layers can be used to help to disperse heat more evenly so that, when the printer plate is attached to a heated printer bed, a more uniformly heated build surface can be provided. As a result, more uniform adhesion between the build surface and the prints can be attained. In addition, the intermediate layers and/or the interlayers can be made of a suitable material (e.g. metallic material) to enable the use of 3D printers with inductive proximity sensors for bed leveling.

Further, in some arrangements, such as in the arrangement shown in FIG. 6, one or more intermediate layers can be used to provide the capability to heat the printer plate where a given 3D printer may not otherwise be able to do so or may not be able to otherwise provide a heated build surface. Further, having a heating element proximate the printing surface can also improve efficiency, reduce the power load required and reduce the necessary heating temperature to obtain the desired temperature at the printing surface.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . or . . . " as used herein refers to and encompasses any and all possible combinations of one or more of the associated listed items. As an example, the phrase "at least one of A, B, or C" includes A only, B only, C only, or any combination thereof (e.g. AB, AC, BC or ABC).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible.

What is claimed is:

1. A printer plate for three dimensional printing comprising:
   a base layer having a first face and a second face, the first face being opposite to the second face; and
   an outer layer operatively connected to the first face of the base layer, the outer layer having an outer surface that defines a first build surface of the printer plate, the outer layer being made of a different material than the base layer, the outer layer being at least partially made of an uncross-linked methyl methacrylate-based acrylic resin, a reinforced acrylic resin, an acrylic resin impregnated laminate, or polyetherimide,
   the outer layer including a metal interlayer.

2. The printer plate of claim 1, wherein the printer plate is bendable or flexible to facilitate the removal of parts that are three dimensionally printed thereon and without separating the outer layer and the base layer.

3. The printer plate of claim 1, wherein the outer layer is operatively connected to the first face of the base layer by an adhesive.

4. The printer plate of claim 1, wherein the base layer is at least partially made of a glass-epoxy material, a glass-epoxy printed circuit board, a woven fiberglass cloth with an epoxy resin binder, a glass-reinforced epoxy laminate having an FR4 grade designation, or a glass-reinforced epoxy laminate having a G10 grade designation.

5. The printer plate of claim 1, wherein the metal interlayer is located between a middle region of the outer layer and the outer surface of the outer layer.

6. The printer plate of claim 1, wherein the metal interlayer is made of a ferrous metal.

7. The printer plate of claim 1, further including an intermediate layer located between the outer layer and the base layer, wherein the intermediate layer is conductive.

8. The printer plate of claim 7, wherein the intermediate layer is defined by a metal cladding on at least a portion of the first face of the base layer.

9. The printer plate of claim 8, wherein the base layer is a glass-epoxy printed circuit board, and wherein the intermediate layer is one of a copper cladding or a copper foil.

10. The printer plate of claim 7, wherein at least a portion of the intermediate layer is configured in a serpentine arrangement.

11. The printer plate of claim 7, wherein the intermediate layer defines one or more contact points exposed to an exterior of the printer plate.

12. The printer plate of claim 7, wherein the intermediate layer is located on substantially the entire first face of the base layer.

13. The printer plate of claim 1, wherein the base layer has an associated coefficient of thermal expansion, and wherein the coefficient of thermal expansion is about 20 ppm/° C. or less.

14. The printer plate of claim 1, wherein the printer plate has an associated thickness, wherein the outer layer has an associated thickness, and wherein the thickness of the outer layer is from about 20% to about 40% of the thickness of the printer plate.

15. The printer plate of claim 1, wherein the outer layer has an associated thickness, wherein the base layer has an associated thickness, and wherein the thickness of the outer layer is from about 70% to about 91% of the thickness of the base layer.

16. A printer plate for three dimensional printing comprising:
    a base layer having a first face and a second face, the first face being opposite to the second face;
    a first outer layer operatively connected to the first face of the base layer, the first outer layer having an outer surface that defines a first build surface of the printer plate; and
    a second outer layer operatively connected to the second face of the base layer, the second outer layer having an outer surface that defines a second build surface for the printer plate,
    the first outer layer and the second outer layer being made of a different material than the base layer, at least one of the first outer layer and the second outer layer being at least partially made of an uncross-linked methyl methacrylate-based acrylic resin, a reinforced acrylic resin, an acrylic resin impregnated laminate, or polyetherimide,
    the first outer layer including a metal interlayer.

17. The printer plate of claim 16, wherein the printer plate is bendable or flexible to facilitate the removal of parts that are the dimensionally printed thereon and without separating the first outer layer and the second outer layer from the base layer.

18. The printer plate of claim 16, further including an intermediate layer located between the first outer layer and the base layer, wherein the intermediate layer is conductive.

19. The printer plate of claim 18, wherein the intermediate layer is defined by one of a metal cladding or a metal foil on at least a portion of the first face of the base layer.

20. The printer plate of claim 18, wherein the intermediate layer is located on substantially the entire first face of the base layer.

21. The printer plate of claim 16, wherein the first outer layer and the second outer layer are made of different materials.

22. The printer plate of claim 16, wherein the base layer is made of a glass-epoxy material, a glass-epoxy printed circuit board, a woven fiberglass cloth with an epoxy resin binder, a glass-reinforced epoxy laminate having an FR4 grade designation, or a glass-reinforced epoxy laminate having an G10 grade designation.

23. The printer plate of claim 16, wherein the metal interlayer is located between a middle region of the first outer layer and the outer surface of the first outer layer.

24. The printer plate of claim 16, wherein the metal interlayer is made of a ferrous metal.

* * * * *

UNITED STATES PATENT AND TRADEMARK OFFICE
CERTIFICATE OF CORRECTION

PATENT NO.        : 9,833,944 B1
APPLICATION NO.   : 14/717351
DATED             : December 5, 2017
INVENTOR(S)       : Robert Wayne Huthmaker It is certified that error appears in the above-identified patent and that said Letters Patent is hereby corrected as shown below:

In the Specification

Column 4, Line 17: delete "400%" and insert --40%--.
Column 5, Line 42: delete "TL" and insert --T1--.
Column 6, Line 8: delete "12" and insert --T2--.
Column 6, Line 25: delete "12" and insert --T2--.

In the Claims

Column 16, Line 23: delete "the dimensionally" and insert --three dimensionally--.

Signed and Sealed this
Fifth Day of June, 2018

Andrei Iancu
*Director of the United States Patent and Trademark Office*